United States Patent
Borehag

[15] 3,659,811
[45] May 2, 1972

[54] SAFETY DEVICE FOR AIRCRAFT BARRIERS

[72] Inventor: Leif Mathias Borehag, Norrkoping, Sweden

[73] Assignee: Borgs Fabriks AB, Norrkoping, Sweden

[22] Filed: Oct. 23, 1970

[21] Appl. No.: 83,437

[30] Foreign Application Priority Data

Dec. 22, 1969 Sweden..................................17715

[52] U.S. Cl. .......................................................244/110 C
[51] Int. Cl. ..................................................B64f 1/02
[58] Field of Search....................................244/110

[56] References Cited

UNITED STATES PATENTS 2,675,197   4/1954   Hospers ..............................244/110 R

FOREIGN PATENTS OR APPLICATIONS 1,193,078   10/1959   France ..............................244/110 R

*Primary Examiner*—Duane A. Reger
*Assistant Examiner*—Paul E. Sauberer
*Attorney*—Munson & Fiddler

[57] ABSTRACT

An aircraft arresting system comprising a wire arranged in the path of a landing aircraft and adapted to be engaged by a hook on the aircraft. The ends of the wire are connected to brakes. A barrier net is located behind the wire and is spaced therefrom. Means is provided for raising the barrier net to position it in the path of the aircraft whenever an aircraft fails to engage the wire, with means provided for permitting the barrier net to remain lowered and out of the path of the aircraft when the aircraft successfully engages with the wire.

4 Claims, 3 Drawing Figures

Patented May 2, 1972

3,659,811

INVENTOR.
LEIF MATHIAS BOREHAG
BY
MUNSON & FIDDLER
ATTORNEYS

SAFETY DEVICE FOR AIRCRAFT BARRIERS

BACKGROUND OF THE INVENTION

It has long been known that aircraft which, because of brake failure or for other reasons, are unable to stop on the length of a runway available, can be brought to a halt by means of so-called safe landing barrier systems installed at the end of the runway. These barriers are normally in the form of net structures, or a system employing an arrester hook and arrester wires.

Both of these basic types of barrier systems have been in use for many years, although the arrester principle involving a hook has become more popular during recent years, because of the operational and economic advantages afforded by it.

The arrester hook principle has certain deficiencies. With such devices the danger of an unsuccessful landing is always present, since the arrester hook of the aircraft is liable to bounce over the arrester wire when the hook is dragged along the surface of the runway as a result of irregularities in said surface.

In the case of an interrupted take-off for example, as the result of engine trouble, the aircraft is often travelling at high speeds, whereby dropping of the hook may be delayed. In such cases, the aircraft is unable to use the barrier system and will overshoot the runway, often with fatal consequences to the pilot and the aircraft.

This problem was solved by using a net structure as a safety measure complementary to the primary hook arrester system. Consequently, double barrier systems have been found desirable and are often installed. The disadvantages occurring with the use of double barrier systems is that the net barrier must be placed beyond the full arresting and braking distance of the arrester hook system such as a double arresting distance, one for each system, of totally approximately 500 meters being required at each end of the runway, as shown in FIG. 1 of the accompanying drawing.

The disadvantages will be readily apparent when observing that for a given space the length of the runway is thereby either shortened or conversely, lengthened to a corresponding extent. The present invention enables the usually necessary double arresting distance to be considerably reduced. This is achieved by the fact that the safety net barrier, which is installed approximately only 100 meters behind the arrester hook system, is normally held in a collapsed condition and lying flat on the ground and is automatically activated, this is lifted, only when an approaching aircraft fails to catch a wire in the preceding hook system.

DESCRIPTION

The invention is diagrammatically illustrated in the accompanying drawing in which.

Figure 1:
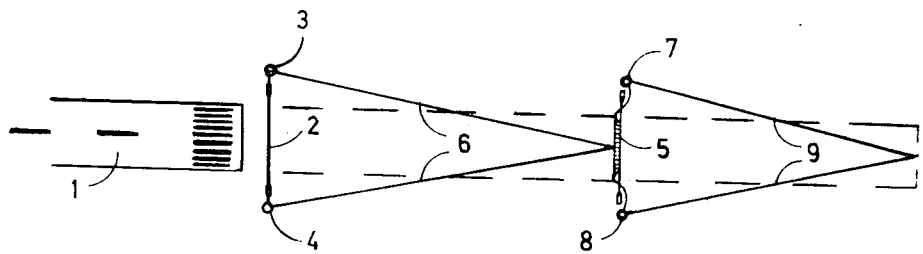
FIG. 1 is a top plan view of a runway equipped with known barrier structures.
Figure 2:
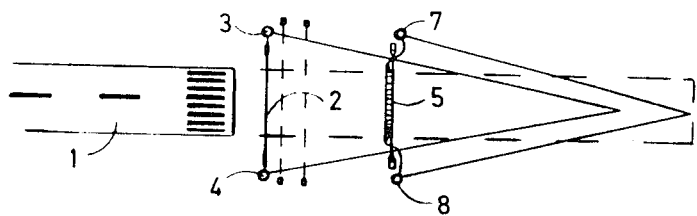
FIG. 2 is a top plan view of a runway equipped with barrier structures according to the present invention.

At 1 in FIG. 1 is shown an aircraft runway. Positioned across the runway extension is a wire 2, the ends of which are connected to brakes 3 and 4. Arranged some distance behind the wire 2, when viewed in the direction of landing of an aircraft, is a collapsible and elevatable, transversely extending net 5, the distance from the wire to the net corresponding to the distance travelled by the aircraft after being arrested by the wire 2. The lines 6 show the position assumed by the wire 2 when caught by the hook of the aircraft. The net 5 is connected to brakes 7 and 8 and the lines 9 show the position taken by the net when arresting the movement of an aircraft. FIG. 1 shows that with known constructions, the distance between the wire 2 and the net 5 must be quite considerable, if a plane arrested by means of the wire 2 is to be prevented from running into the net 5. FIG. 2 illustrates how the distance between the line 2 and the net 5 can be reduced by means of the present invention.

Figure 3:
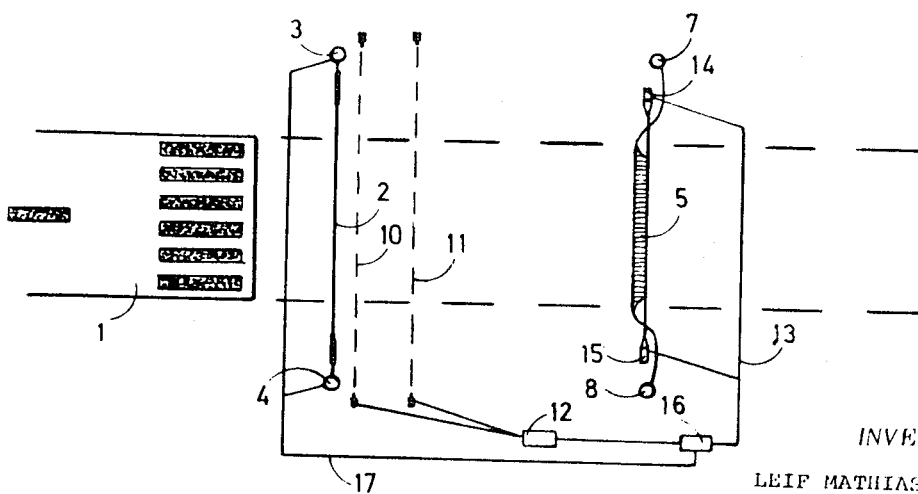
FIG. 3 is a view of the same runway and barrier structures illustrated in FIG. 2, but including the control means associated therewith.

In the embodiment illustrated in FIG. 3, there are arranged along the wire 2 photocell gates 10 and 11 which are connected to an automatic net-raising system 12, which is connected by means of an electric circuit 13 to devices 14 and 15 by means of which the net can be quickly raised should the aircraft travel past without connecting to the wire 2. Connected in the circuit 13 is a breaker relay 16 which is connected to the wire brakes 3 and 4 or the wire 2 by means of a line 17. The breaker relay 16 is arranged to break the signal circuit 13 in response to a signal transmitted from the brakes 3 and 4 or the wire 2 subsequent to their actuation when an aircraft is arrested by the wire.

The selective function of the system is achieved partly by the fact that the net barrier is connected to the automatic net-raising system, based on the photocell technique for example, which will normally always bring the net to a raised position when an aircraft passes the photocell gates 10 and 11.

However, with the aid of magnets attached to the brake drums of the arrester hook system and with induction coils firmly positioned adjacent to the brake drums, an electric current can be obtained immediately when the drums begin to rotate, that is as soon as the arrester hook of the aircraft engages the wire.

According to the present invention, this induced electric current is now used to break the net-activating end circuit of the net-raising system with the assistance of the relay 16 placed in the system, to thereby render impossible the normal activation of the net barrier 5.

The relay 16 holds the end circuit broken during the arresting movement of the arrester wire 2 and then recloses the circuit. If the arrester wire system is not activated, no electric current is induced, whereupon the automatic net-raising system activates the safety net barrier in the normal manner.

In using the described selection-type safe landing barrier system, the high degree of safety afforded by the double barrier combination is obtained together with a short arresting distance, while at the same time high retardation loads on the aircraft, caused by the aircraft possibly meeting two sequentially arranged barriers at once, are avoided.

Because the net barrier is normally flat on the ground, an aircraft may also land, in special emergency conditions, on the end of the runway where the net of known systems would otherwise have been found in a raised position, causing an obstruction to landing aircraft.

Instead of obtaining signals to the breaker relay from the brakes, these signals can be obtained with the aid of appropriate means from the wire 2 as it is moved by the aircraft.

What is claimed is:

1. An aircraft arresting system consisting of an arresting wire extending across a runway or its extension, which wire is connected to brakes on both sides of the runway or its extension, a transversely extending collapsible net spaced from the wire and positioned to arrest the aircraft after the aircraft has failed to connect with the wire, means for raising the net automatically when the aircraft fails to catch the arrester wire, the raising means for the net being inoperative whenever the arrester wire is caught by the aircraft, said net-raising means being activated by wire movement obtained when the wire is caught by the aircraft and/or by movement of the brakes so that a resulting impulse prevents raising of the net.

2. A system according to claim 1, wherein, for the purpose of raising the net, there is arranged a current circuit between an automatic net-raising system and a net stanchion system, said circuit operating in such a manner that the net is raised when a passing aircraft activates the automatic net-raising system, and arranged in said circuit is a breaker relay which is adapted to break the circuit in response to a signal obtained from the arrester wire or the wire brakes when the same come into operation.

3. A system according to claim 2, wherein the brakes on the hook arrester system are provided with magnets and induction coils for generating an electric current and passing said current to a breaker relay upon the rotation of the brakes.

4. An aircraft arresting system consisting of an arresting wire extending across the path of a landing aircraft and adapted to be engaged by a hook on the aircraft, a barrier net spaced from the wire, means for automatically raising the barrier net when an aircraft passes the wire without becoming engaged therewith and means for maintaining the barrier net in a lowered position when an aircraft engages and is halted by the wire.

* * * * *